United States Patent Office 3,133,071
Patented May 12, 1964

3,133,071
OCTAHYDROQUINACRIDONES AND OCTAHYDROISOQUINACRIDONES AND PROCESSES FOR PRODUCING SAME
Aaron L. Nelson, Mountainside, N.J., assignor to E. I. du Pont de Nemours and Company, Wilmington, Del., a corporation of Delaware
No Drawing. Filed July 2, 1962, Ser. No. 207,086
5 Claims. (Cl. 260—279)

This invention relates to a new chemical process for the production of quinacridones. It also relates to the preparation of new intermediates which can be readily converted to quinacridones.

Linear quinacridone has the following structural formula:

(Formula 1)

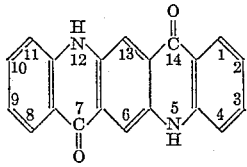

The above compound is well known. It is also well known that the terminal rings of this molecule may be substituted, especially in the 2,9- and 4,11-positions. At the present time, the literature discloses several processes for the production of linear quinacridone which are outlined as follows:

Process No. 1 is found in Annalen 518, 245 (1935). It involves the following steps:

A. Aniline is reacted with a dialkylsuccinylsuccinate to obtain a dialkyl ester of dianilinodihydroterephthalic acid.
B. This dihydro derivative is oxidized to the dialkyl ester of dianilinoterephthalic acid.
C. The ester is hydrolyzed to free dianilinoterephthalic acid.
D. The dianilinoterephthalic acid is cyclized by heating in fused boric acid to yield linear quinacridone.

It has since been shown that many other cyclizing agents can be used in step D to convert dianilinoterephthalic acid to linear quinacridone. Such agents include polyphosphoric acid, and anhydrous aluminum chloride in conjunction with certain aromatic solvents.

Process No. 2 is disclosed in U.S. 2,821,529, and the reaction steps are as follows:

A. Is the same as step A above.
B. In this process, there is a direct cyclization of the dialkyl ester of dianilinodihydroterephthalic acid by heating in an inert high-boiling liquid to yield dihydroquinacridone.
C. The dihydroquinacridone thus obtained is recovered and then oxidized in an alkali-water-alcohol mixture to produce linear quinacridone.

In a third process for the production of quinacridone, the following reaction steps are involved:

A. An arylamine such as aniline is condensed with 2,5-dichloroterephthalic acid to yield dianilinoterephthalic acid.
B. The dianilinoterephthalic acid is cyclized to yield linear quinacridone (same reaction as step D of Process No. 1).

In this third process, the 2,5-dichloroterephthalic acid can be replaced by 4,6-dichloroisophthalic acid, and when this substitution is made, the product resulting from the condensation and cyclization is isoquinacridone which has the following structural formula:

(Formula 2)

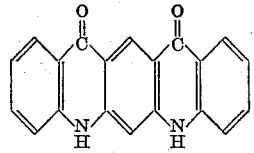

The terminal rings of the above compound may also be substituted, especially in the 2,10 and 4,8 positions.

The present invention provides still another route to the preferred production of linear quinacridones. It also provides a method for the production of isoquinacridone. More particularly, the process of the present invention comprises, as its first step, the reaction of two mols of cyclohexanone which may have one substituent in the 2- or 4-position selected from the group of —F, —Br, —Cl, —CH$_3$, and —OCH$_3$, with one mol of an acid, or an alkyl ester thereof, selected from the group consisting of 2,5-diaminoterephthalic acid and 4,6-diaminoisophthalic acid to form a series of new compounds wherein the terminal rings in these compounds are saturated rings. When the acid is 2,5-diaminoterephthalic acid or a derivative thereof, the new compound produced has the following structural formula:

(Formula 3)

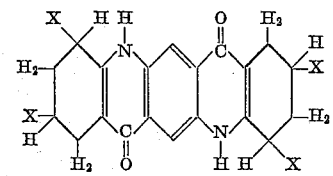

On the other hand, if the acid is 4,6-diaminoisophthalic acid or a derivative thereof, the new compound produced has the following structural formula:

(Formula 4)

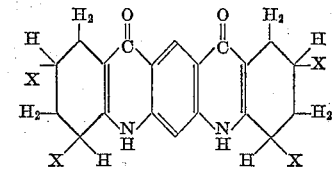

wherein X in both of the above formulas is selected from the group of —H, —F, —Br, —Cl, —CH$_3$, and —OCH$_3$, and each terminal ring has not more than one substituent other than H which is in the same position in each ring relative to the N.

As a second step in the new process, the new octahydroquinacridones are readily dehydrogenated (oxidized) to their corresponding quinacridones which have the following structural formulas:

(Formula 5)

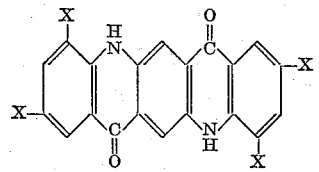

(Formula 6)

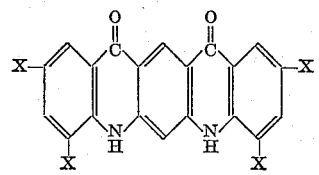

X in Formulas 5 and 6 has the same significance as in Formulas 3 and 4.

This oxidation can be accomplished by heating the octahydro derivatives in the presence of oxygen or a mixture of oxygen and inert gases such as is found in air.

The reactions of this invention are illustrated by the following equations applied to the reaction of unsubstituted cyclohexanone with 2,5-diaminoterephthalic acid.

(Equation 1)

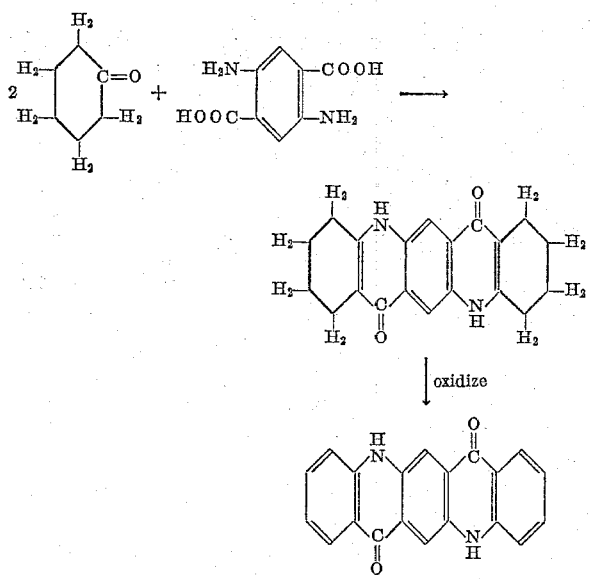

If, in the above reaction, 4,6-diaminoisophthalic acid is used rather than 2,5-diaminoterephthalic acid, the intermediate product is octahydroisoquinacridone having the formula:

(Formula 7)

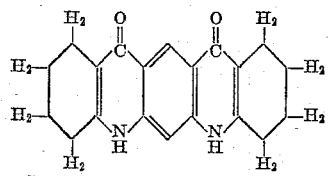

which is oxidized to isoquinacridone having the formula:

(Formula 8)

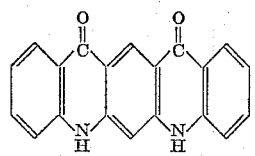

For a clearer understanding of the invention, the following specific examples are given. These examples are intended to be merely illustrative of the invention and not in limitation thereof. Unless otherwise specified, all parts are by weight.

*Example I*

A mixture of 196 parts of 2,5-diaminoterephthalic acid (1 mol)
416 parts of cyclohexanone (4.24 mols)
2 parts of conc. sulfuric acid (96% $H_2SO_4$)

is charged to a suitable vessel equipped for efficient agitation and with a suitable condenser system to provide for reflux of high-boiling liquids and the removal therefrom of a low-boiling liquid such as water. With good agitation, the mixture is heated rapidly to the boil and held at the boil under reflux for about 2 hours, while the water formed in the reaction is removed by fractionation. When no more water is released, as indicated by the temperature in the fractionating column rising substantially above 100° C., heating is stopped and the charge cooled to about 50° C., whereupon the solid reaction product is isolated from the slurry by filtering. It is reslurried in hot 5% aqueous sodium hydroxide solution to remove unreacted diaminoterephthalic acid, filtered again, washed alkali free, and dried to give 320 parts of yellow octahydroquinacridone.

*Analytical data.*—Calculated for $C_{20}H_{18}N_2O_2$: C, 74.97%; H, 6.29%; N, 8.74%. Found: C, 75.73%; H, 6.43%; N, 9.06%.

*Example II*

A small sample (about 0.5 gm.) of the product of Example I is placed in a porcelain boat which is then placed near one end of a quartz tube of suitable dimensions and equipped with suitable closures for operating under vacuum and for the passage of a small stream or air. The end containing the boat is heated rapidly under vacuum of about 10 mm. of Hg to a temperature of about 300° C. and then more slowly to about 375° C. while bleeding into the hot end of the tube about 10 ml. of air per minute. Heating at about 375° C. is continued for several hours, whereupon a red mat collects in the cool portion of the tube. Examination of this red mat by infrared absorption shows conclusively that it is quinacridone.

*Example III*

The octahydroquinacridone of Example I is also oxidized to quinacridone by being passed through a calciner, maintained at 500–600° C., along with a stream of air. As the stream of air leaves the calciner, it is passed through a water scrubber which removes the fine particles of quinacridone from the air stream. The pigment is recovered from the resulting aqueous suspension by filtering and drying. When run at atmospheric pressure, yields of about 20% are obtained. By operating at a reduced pressure (below 15 mm. Hg), the yield may be increased to about 50% or better. The product is identified as quinacridone by its physical properties including color, X-ray diffraction spectrum and infrared absorption spectrum.

*Example IV*

Following the process of Example I, 196 parts of 4,6-diaminoisophthalic acid is reacted with 416 parts of cyclohexanone in the presence of sulfuric acid to give about 320 parts of yellow octahydroisoquinacridone. When pyrolyzed in the presence of air at reduced pressure, this material is oxidized to isoquinacridone which is identified by infrared absorption and X-ray diffraction.

Although the examples have shown the use of the diaminobenzenedicarboxylic acids, the corresponding lower alkyl esters (dimethyl or diethyl esters) may be used with equal facility. These would include dimethyl 3,5-diaminoterephthalate, diethyl 4,6-diaminoisophthalate and the like. Cyclohexanone substituted in the two or four positions with —Cl, —$CH_3$, —$OCH_3$ and the like may also be used to give the corresponding substituted quinacridones. Examples of substituted cyclohexanones which may be used include 2-chlorocyclohexanone, 2-methylcyclohexanone, 4-methoxycyclohexanone, 4-fluorocyclohexanone, 4-bromocyclohexanone, 4-chlorocyclohexanone, and the like.

The condensation is catalyzed by mineral acid, but may also be carried out in the absence of added catalyst. Since the reaction involves the loss of water, it is preferable that it be carried out at temperatures well above 100° C. and under conditions which permit the removal of the water as formed in the reaction. Usually the boiling point of the ketone, which is preferably present in excess, provides a suitable temperature.

The oxidation step to convert the octahydroquinacridone to quinacridone is a vapor phase reaction and requires temperatures sufficiently high to sublime the octahydroquinacridone. A minimum temperature of 350–

400° C. seems to be necessary, with improved yields resulting from the use of higher temperatures in the range of 550–600° C. Air or gaseous oxygen supplies the oxidizing medium. It is preferred to use a reduced pressure during the oxidation reaction, say, below 15 mm. Hg. However, it is also possible to carry out the oxidation in air at atmospheric pressure.

The examples have shown the condensation of cyclohexanone with diaminoterephthalic acid, but the reaction is general to compounds containing a carbonyl group adjacent to at least one methylene group such as cyclopentanone, cycloheptanone, cyclooctanone, desoxybenzoin, and the like. For example, if 386 parts of cyclopentanone is reacted with 196 parts of 2,5-diaminoterephthalic acid in the presence of sulfuric acid in accordance with procedure set forth in Example I, a yellow product is obtained having the following formula:

(Formula 9)

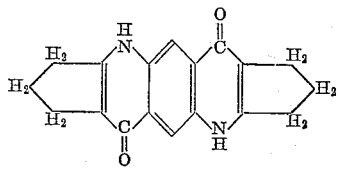

The process of this invention is also applicable to the production of angular quinacridone. If 196 parts of 3,6-diaminophthalic acid is substituted for the diaminoterephthalic acid in Example I, octahydro-N-para-angular quinacridone is obtained. This latter product can be oxidized following the procedure of Example II to produce the angular quinacridone, quin(3,2a)acridine-13,14(5,8)dione.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for the production of an octahydroquinacridone comprising condensing 2 mols of cyclohexanone with one mol of an o-diaminobenzenedicarboxylic acid by heating under reflux in the presence of an excess of the cyclohexanone whereby a simultaneous condensation and ring closure takes place.

2. Octahydroquinacridone of the formula:

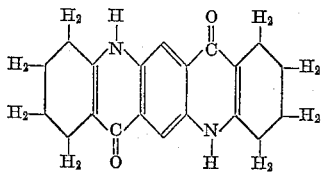

3. Octahydroisoquinacridone of the formula:

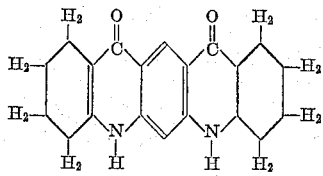

4. A compound selected from the group consisting of

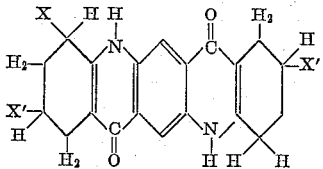

and

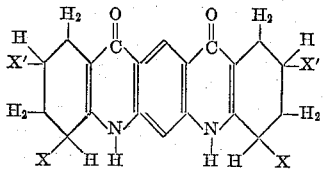

wherein X and X' are selected from the group consisting of —H, —F, —Br, —Cl, —CH₃, and —OCH₃, and at least one of X and X' is hydrogen.

5. In a process for the production of a compound selected from the group consisting of quinacridones and isoquinacridones the step comprising heating in the presence of oxygen and at temperatures of 375° C. to 600° C. a compound selected from the group consisting of

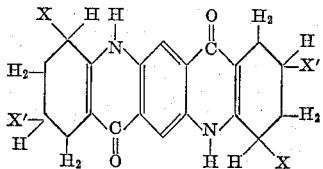

and

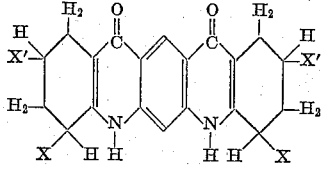

wherein X and X' are selected from the group consisting of —H, —F, —Br, —Cl, —CH₃, —OCH₃, and at least one of X and X' is hydrogen.

References Cited in the file of this patent

Kinsley et al.: J. Chem. Soc. (London), 1958, pp. 1–7, QD1C6.

UNITED STATES PATENT OFFICE
CERTIFICATE OF CORRECTION

Patent No. 3,133,071                       May 12, 1964

Aaron L. Nelson

It is hereby certified that error appears in the above numbered patent requiring correction and that the said Letters Patent should read as corrected below.

Column 6, lines 11 to 17, the structural formula should appear as shown below instead of as in the patent:

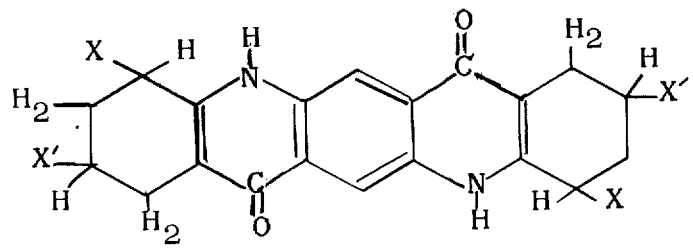

(SEAL)
Attest:

Signed and sealed this 8th day of September 1964.

ERNEST W. SWIDER
Attesting Officer

EDWARD J. BRENNER
Commissioner of Patents